United States Patent
Snow

(10) Patent No.: US 9,803,888 B2
(45) Date of Patent: Oct. 31, 2017

(54) HVAC BASE AND RETURN AIR SYSTEM

(71) Applicant: Maximum Air LLC, Salem, UT (US)

(72) Inventor: Ryan L. Snow, Salem, UT (US)

(73) Assignee: Maximum Air LLC, Salem, UT (US)

( * ) Notice: Subject to any disclaimer, the term of this patent is extended or adjusted under 35 U.S.C. 154(b) by 643 days.

(21) Appl. No.: 13/797,096

(22) Filed: Mar. 12, 2013

(65) Prior Publication Data

US 2013/0233306 A1     Sep. 12, 2013

Related U.S. Application Data

(60) Provisional application No. 61/609,916, filed on Mar. 12, 2012.

(51) Int. Cl.
| | |
|---|---|
| *F24F 7/00* | (2006.01) |
| *F24H 9/06* | (2006.01) |
| *B23P 19/00* | (2006.01) |
| *F24F 13/32* | (2006.01) |

(52) U.S. Cl.
CPC ............... *F24H 9/06* (2013.01); *B23P 19/00* (2013.01); *F24F 7/00* (2013.01); *F24F 13/32* (2013.01); *Y10T 29/49826* (2015.01)

(58) Field of Classification Search
CPC ... F24H 9/06; F24F 13/32; F24F 13/20; F24F 13/202; F24F 13/205; F16M 13/00
USPC .............. 126/99 R, 515, 106, 112, 114, 193; 454/254, 370; 248/670, 176.3, 188.2, 248/678, 346.01, 346.02, 346.5; 5/503.1, 5/507.1, 3; 312/223.1
See application file for complete search history.

(56) References Cited

U.S. PATENT DOCUMENTS

| | | | |
|---|---|---|---|
| 485,301 | A | 11/1892 | Scates |
| 574,271 | A | 12/1896 | Roberts |
| 1,726,727 | A | 9/1929 | Wood |
| 2,647,506 | A | 8/1953 | Heiman |
| 3,602,006 | A | 8/1971 | Metcalfe |
| 3,605,879 | A | 9/1971 | Schaefer |
| 3,662,738 | A | 5/1972 | Solka |
| 3,791,535 | A | 2/1974 | Baker |
| 4,044,950 | A | 8/1977 | Engeling |
| 4,171,693 | A | 10/1979 | Pearson |
| 4,223,205 | A | 9/1980 | Sturgis |

(Continued)

FOREIGN PATENT DOCUMENTS

| | | |
|---|---|---|
| CN | 1580654 A | 2/2005 |
| EP | 1508755 A1 | 2/2005 |

(Continued)

OTHER PUBLICATIONS

International Search Report and the Written Opinion of the International Searching Authority in related PCT Application No. US2013/030575.

(Continued)

*Primary Examiner* — Steven B McAllister
*Assistant Examiner* — Ko-Wei Lin
(74) *Attorney, Agent, or Firm* — Clegg, PC; Perry S. Clegg

(57) ABSTRACT

A base is provided for installation of an HVAC system which allows for high efficiency air intake. The HVAC base and air return system provides for intake of air simultaneously through the bottom and side of a furnace unit. The HVAC base and air return system allow for installation and use of a wider filter box.

16 Claims, 5 Drawing Sheets

(56) References Cited

U.S. PATENT DOCUMENTS

| | | |
|---|---|---|
| 4,361,131 A | 11/1982 | Homolik |
| 4,568,264 A | 2/1986 | Mullen |
| 4,602,676 A | 7/1986 | Bergeron |
| 4,628,798 A | 12/1986 | Tagnon |
| 4,730,771 A | 3/1988 | Shepherd |
| 4,735,130 A | 4/1988 | Seppamaki |
| 4,827,901 A | 5/1989 | Jackson |
| 4,919,123 A | 4/1990 | Jackson |
| 5,054,380 A | 10/1991 | Hubbard |
| 5,997,295 A | 12/1999 | Mattson |
| 6,092,794 A | 7/2000 | Reens |
| 6,260,815 B1* | 7/2001 | Allen .................. F24H 9/06 248/176.3 |
| 6,318,096 B1 | 11/2001 | Gross |
| 6,779,735 B1 | 8/2004 | Onstott |
| 6,925,999 B2 | 8/2005 | Hugghins |
| 7,065,978 B2 | 6/2006 | Hong et al. |
| 8,262,054 B2 | 9/2012 | Stansbury |
| 2002/0100854 A1 | 8/2002 | Stansbury |
| 2004/0061039 A1 | 4/2004 | Stansbury |
| 2004/0130154 A1 | 7/2004 | Stepp |
| 2005/0034472 A1 | 2/2005 | Hong et al. |
| 2005/0035266 A2 | 2/2005 | Stansbury |
| 2005/0035267 A1 | 2/2005 | Stansbury |
| 2005/0194003 A1 | 9/2005 | Paulsen |
| 2006/0130502 A1 | 6/2006 | Wruck |
| 2006/0174560 A1 | 8/2006 | Levine |
| 2007/0204752 A1* | 9/2007 | Hord .................. F24F 13/32 96/390 |
| 2011/0174891 A1 | 7/2011 | Kowald |
| 2011/0244408 A1 | 10/2011 | Stires |

FOREIGN PATENT DOCUMENTS

| | | |
|---|---|---|
| EP | 1508755 B1 | 5/2007 |
| ES | 2285360 T33 | 11/2007 |
| KR | 10-0529914 B1 | 11/2005 |
| KR | 10-0529920 B1 | 11/2005 |
| KR | 10-0529921 B1 | 11/2005 |

OTHER PUBLICATIONS

International Preliminary Report on Patentability in related PCT Application No. US2013/030575.
Allreds.net, website, http://www.allreds.net/WS2/catalog1.html?wscdet_show=000000000100400000400400.

* cited by examiner

HVAC BASE AND RETURN AIR SYSTEM

PRIORITY

The present application claims the benefit of U.S. Provisional Patent Application Ser. No. 61/609,916, filed on Mar. 12, 2012, which is incorporated herein by reference in its entirety.

THE FIELD OF THE INVENTION

The present invention relates to structures and methods for air return and intake in heating, ventilation, and air conditioning systems. More specifically, the present invention relates to bases installed under heating, ventilation, and air conditioning systems to increase air intake and airflow.

BACKGROUND

Heating, ventilation, and air conditioning systems (sometimes referred to as HVAC systems) are commonly used to provide ventilation, reduce air infiltration, maintain pressure relationships between spaces, and control thermal comfort and indoor air quality in residential and commercial structures, such as homes and office buildings. An HVAC system's ability to satisfactorily provide these benefits may depend on adequate air intake, air return, and airflow. Proper and efficient airflow may also save energy, decrease operational costs, and increase the life of the HVAC system.

However, methods and components commonly used for HVAC system intake and return air pathways have some disadvantages. Moreover, meeting the requirements from government regulations and manufacturer's specifications using currently available industry methods and components can be challenging.

HVAC systems used to be commonly installed directly to a floor and the intake and return air ducts connected to and directed air into the lateral side of the furnace unit. However, this method of installation and directing of airflow has several disadvantages. One disadvantage is that the furnace unit's metal frame is more likely to rust from exposure to moisture when mounted directly on the floor. Another disadvantage is that directing intake and return air through the lateral side of a furnace unit does not allow for maximum airflow efficiency.

Some attempts have been made to overcome these problems by installing HVAC systems on bases. Bases currently available are typically made of galvanized aluminum sheet metal and allow the HVAC system to be installed about ten inches above the floor. These aluminum sheet metal bases typically attempt to increase airflow by directing intake and return air into the furnace unit through the bottom side of the furnace instead of through the lateral side of the furnace. These aluminum sheet metal bases are typically configured to receive a return air duct on the top side of the base so that airflow travels down through the top of and into the base where the air subsequently travels underneath the furnace unit and then up and into the furnace unit. However, there are a number of disadvantages to these types of HVAC bases and methods for directing airflow in an HVAC system.

One disadvantage with currently available bases is that air intake and return may be limited to traveling through the bottom side of the furnace unit and therefore may not permit maximum airflow efficiency. Also, HVAC systems installed in conjunction with currently available bases may be more prone to premature failure of the furnace and central air units due to the airflow limitations.

Another problem is that a narrower filter box (e.g., one inch filter rack) commonly has to be used when an HVAC system is installed on a base in a home having standard eight foot ceilings, because the filter box is installed horizontally between the top of the base and the bottom side of the furnace and the HVAC system may not have enough head room to permit installation of a wider filter box (e.g., a five inch filter rack). Narrower filter racks typically do not filter air as effectively as wider filter racks and therefore may negatively affect the quality of air being circulated in a home or business.

Another problem is that sheet metal bases commonly bow from the weight of the furnace mounted above the base and the magnitude of the bow may increase over time. Furthermore, the metal base and furnace frame may be disposed to rust or corrosion at metal-to-metal connection points between the furnace and the base. Moreover, a metal base may be disposed to rust and corrosion on its bottom side from exposure to moisture on the floor.

Installing HVAC systems on bases currently available can also be labor intensive and require many steps to configure the HVAC system with the base. For example, persons installing HVAC systems commonly have to size and cut a hole in the top of the base to fit the filter box and furnace that are to be mounted thereon. Moreover, there is a risk of multiple potential leak points when installing and HVAC system on a sheet metal base, which may increase inefficiencies in airflow if not properly sealed. Ensuring that these potential leak points are properly sealed can be labor intensive.

It is thus desirable to have an in a durable HVAC base and air return system that improves airflow and efficiency, reduces time and labor to install, and facilitates good air filtering.

SUMMARY OF THE INVENTION

It is an object of the present invention to provide an improved HVAC base and air return system.

According to one aspect of the invention, a base for installation of an HVAC system is provided which allows for simultaneous intake of air through the bottom and lateral side of a furnace unit. In accordance with another aspect of the invention, the base has three lateral side walls with a forth lateral side being an opening for attaching a filter box or a return air duct. One or more braces or supports may be disposed on the base for supporting or installing a furnace on the base. According to yet another aspect of the invention, a plurality of the lateral side walls include a lip or rim extending above the height of the braces or supports. In another embodiment of the invention, the lip or rim extends from the supports. The lip or rim may create a seal between the base and the furnace to reduce air leaks.

According to another aspect of the invention, the base allows for single step installation of a furnace by creating a seal between the base and the furnace when the furnace is disposed on the supports within the base.

In accordance with another aspect of the invention, the bottom and lateral walls of the base, the supports, and the lip(s) may be integrated. The components of the HVAC base may also be comprised of a single unit. In another aspect of the invention, the base may be a singularly cast or machined body. The base may also be comprised of a temperature resistant material. The base may also be comprised of a rust or corrosion resistant material. In yet another aspect of the invention, the base is comprised of a hi-composite polymer or plastic.

According to another aspect of the invention, an HVAC return air system is provided comprising a furnace base including furnace supports and a lip or rim extending above the furnace supports from a plurality of lateral walls of the furnace base; a furnace disposed on the furnace supports in said furnace base so that the lip of the furnace base extends over a portion of the furnace frame; a filter box simultaneously disposed on a lateral side of the furnace and a lateral side of the furnace base, wherein said lateral sides of the furnace and furnace base are configured with openings to permit airflow; and an air duct is configured on the air filter so as to permit air to flow from the air duct into the air filter and then simultaneously through both the lateral side and bottom side of the furnace.

These and other aspects of the present invention are realized in an HVAC base and air return system as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
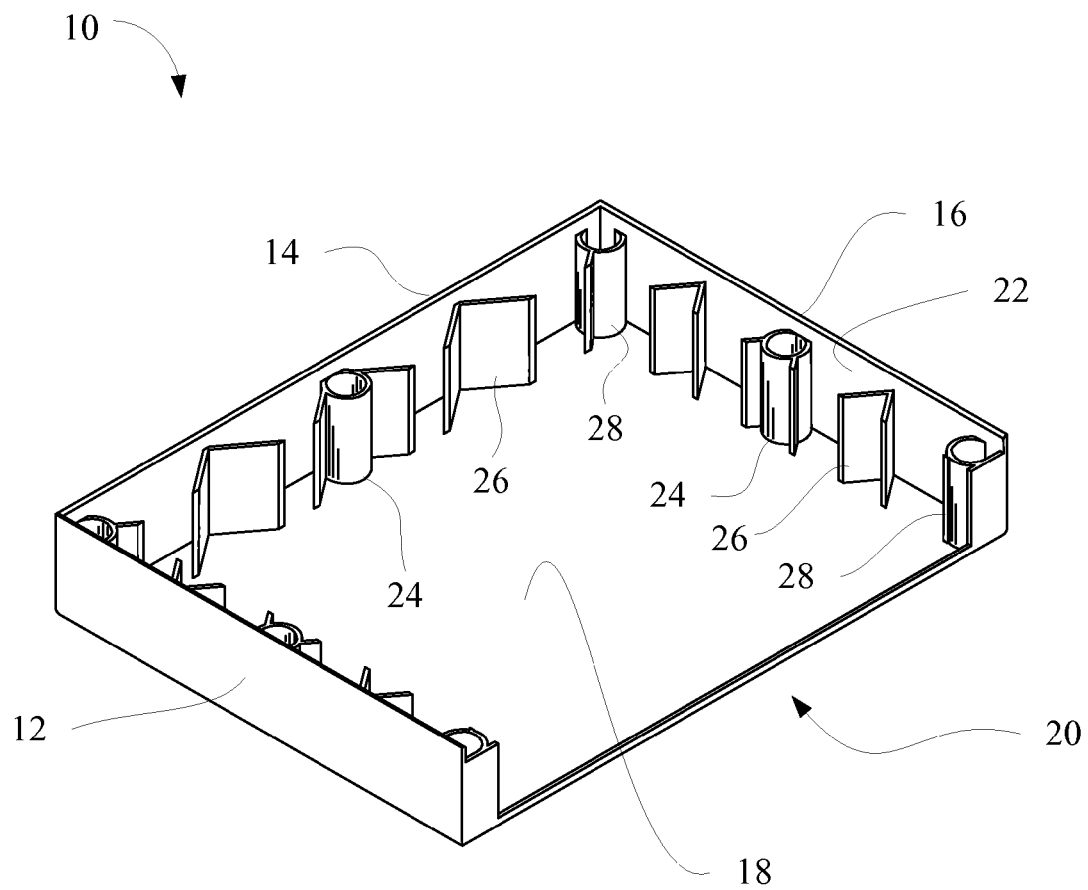
FIG. 1 shows a perspective view of an HVAC system base according to the present invention.
Figure 7:
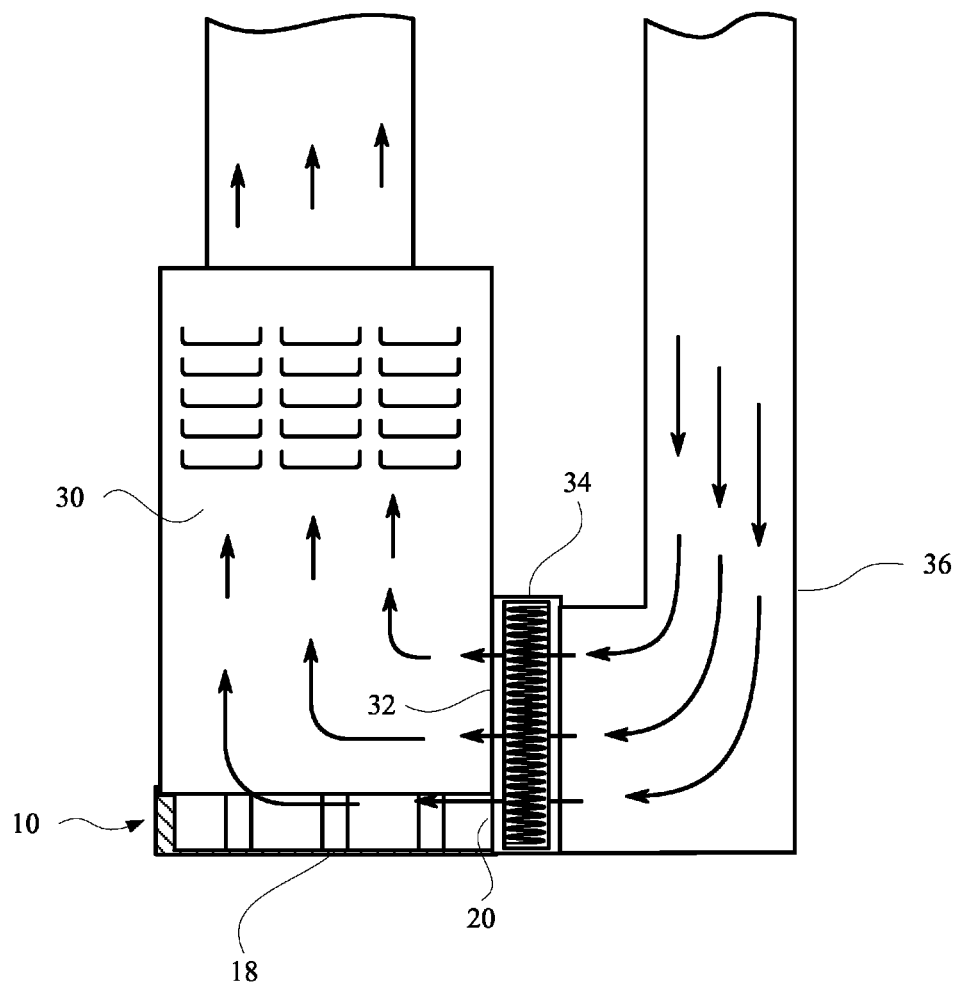
FIG. 7 shows a side view of an HVAC system and base configured with a filter box and return air duct in accordance with the present invention.

Turning now to FIG. 1, a perspective view of a furnace base 10 for an HVAC system in accordance with the present invention is shown. The furnace base 10 may be comprised of three lateral wall members 12, 14, 16, a bottom side member 18, and one or more support members 24, 26, 28. The furnace base is generally in the shape of a rectangular box. A fourth side of the rectangular furnace base is comprised of an opening 20 to allow air to pass into the furnace base where it may subsequently travel up through the bottom of a furnace unit 30 as shown in FIG. 7, which furnace unit 30 may be installed in the furnace base on the support members 24, 26, 28.

The support members 24, 26, 28 shown in FIG. 1 include A-frame shaped support members 26 and tubular shaped support members 24, 28.

Figure 3:
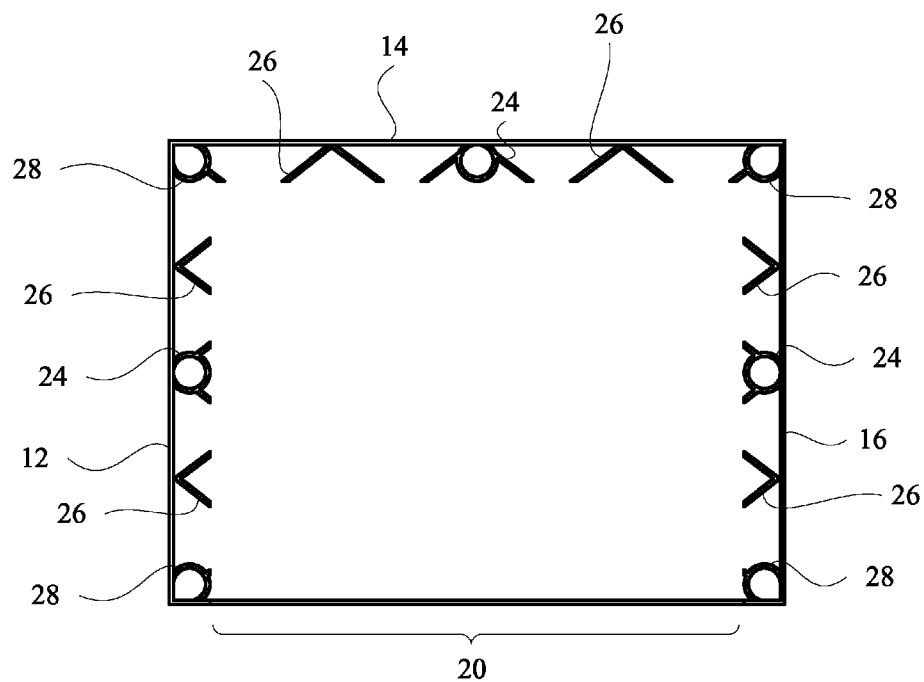
FIG. 3 shows a top view of the HVAC system base of FIG. 1.

FIG. 3 provides a top view of the furnace base 10 of FIG. 1 and shows another perspective of various shapes that may be used for the support members 24, 26, 28. However, it should be appreciated that support members having other shapes may also be used. Furthermore, while it is preferable to use a plurality of support members, it should also be appreciated that a single support member extending along a plurality of sides within the interior of the furnace base could be used.

Figure 6:
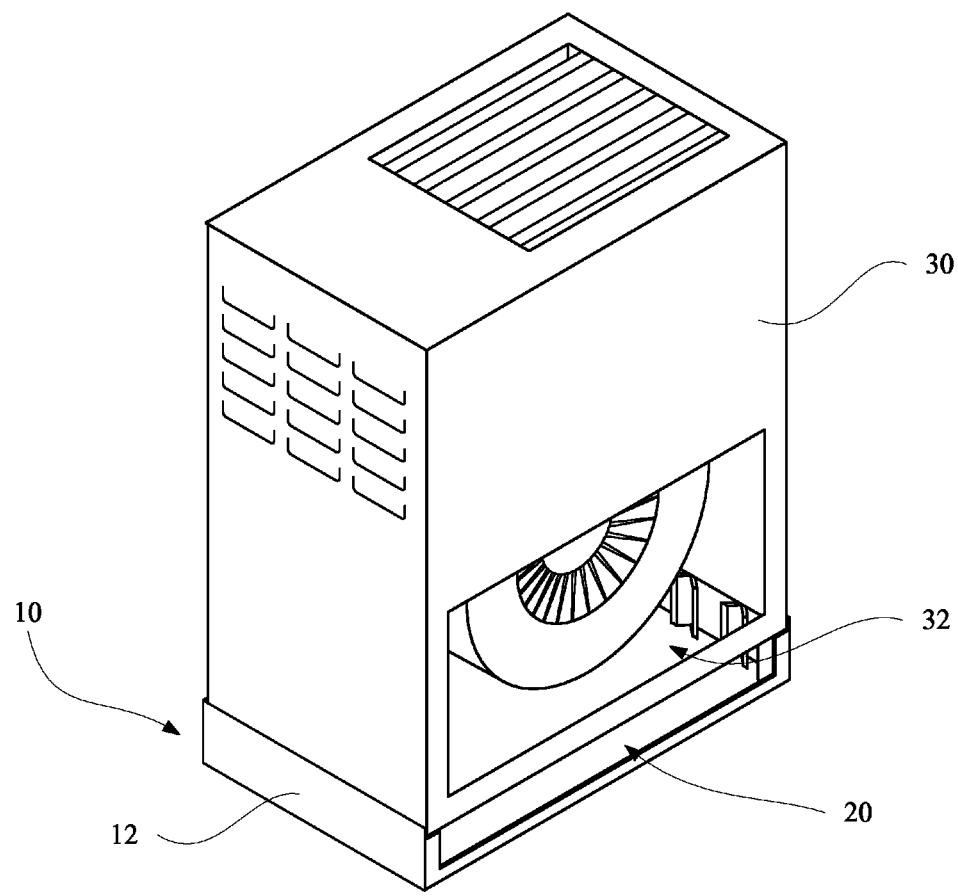
FIG. 6 shows a furnace unit disposed in an HVAC system base in accordance with the present invention.

As shown in FIG. 1, the furnace base 10 of the present invention may include a rim 22 extending from the lateral wall members above the support members 24, 26, 28. The rim 22 may be part of the lateral wall member or may be a separate component of the furnace base 10 extending above the support members 24, 26, 28. It should also be appreciated that the furnace base 10 may include more than a single rim 10. The rim 10 may be configured to cover a portion of the furnace unit 30, as shown in FIG. 6, providing a seal between the furnace base 10 and the furnace unit 30 and reducing air leakage.

Figure 2:
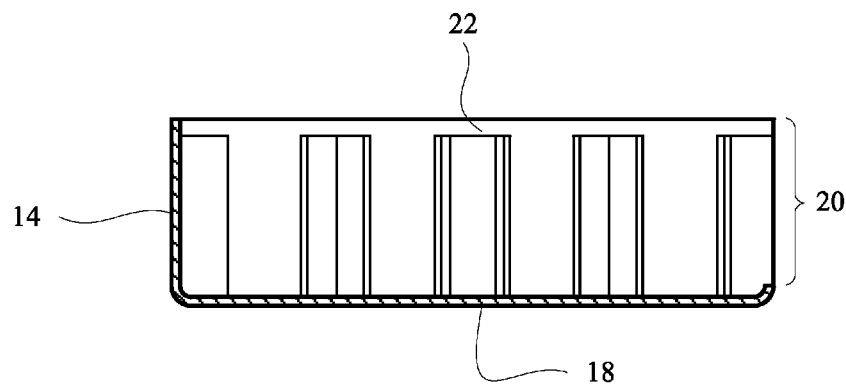
FIG. 2 shows a cutaway view of the HVAC system base of FIG. 1.
Figure 4:
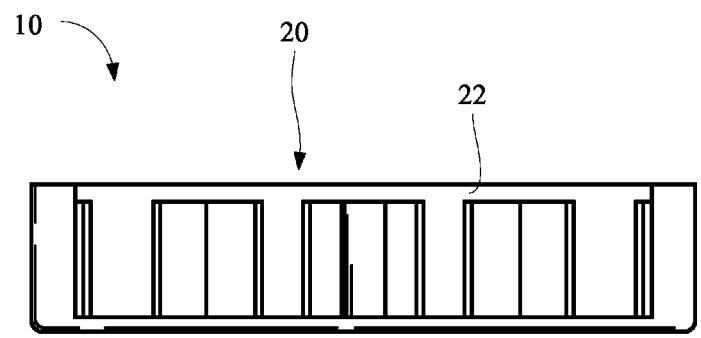
FIG. 4 shows a side view of an HVAC system base in accordance with an embodiment of the present invention.
Figure 5:
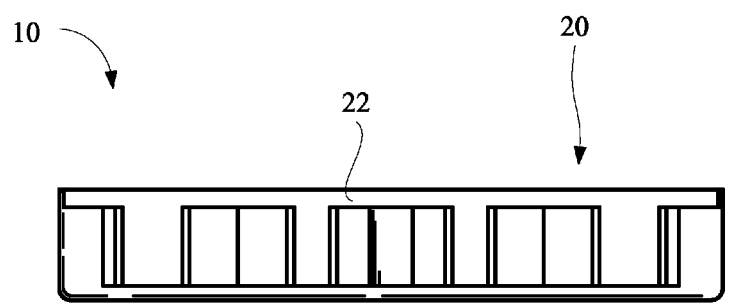
FIG. 5 shows a side view of the HVAC system base of FIG. 1.

FIG. 2 provides a cutaway view of the furnace base 10 of FIG. 1 and shows another perspective of the rim 22 extending above the support members 24, 26, 28 of the furnace base 10. FIGS. 4 and 5 are perspective views of the present invention facing the fourth lateral side of the furnace base 10 and the opening 20 defining the fourth lateral side. FIGS. 4 and 5 show two different embodiments of the rim 22. As shown in FIG. 4, in one embodiment the rim 22 may extend around onto the fourth lateral side of the furnace base 10. As shown in FIG. 5, in another embodiment the rim 22 does not extend around onto the fourth lateral side of the furnace base 10.

In one embodiment of the present invention, the rim 22 is comprised of a three quarter inch lip; however it should be appreciated that the rim may extend such distance above the support members 24, 26, 28 as may be optimal to secure the furnace unit 30 in the furnace base 10 and to prevent air from leaking from juncture between the furnace unit 30 and the furnace base 30 when the furnace unit 30 is installed in the furnace base 10.

The furnace base 10, including the side wall members 12, 14, 16, the bottom side member 18, the support members 24, 26, 28, and the rim 22 may be composed of any number of heat resistant materials, including heat resistant plastics and high-composite polymers. Preferably, the heat resistant materials will be castable or machinable so that the furnace base 10 and its components may be made using injection molding or by way of machining. It is also preferable that the furnace base 10 and its components be composed of rust or corrosion resistant materials.

In one embodiment of the present invention, the furnace base 10 and its components are made using injection molding. In another embodiment of the present invention the furnace base is made by machining the components using tooling. It should be appreciated that the furnace base 10 and other components of the present invention can be made using any tools, techniques, and materials available to one skilled in the art.

In an embodiment of the present invention, the furnace base 10, including the side wall members 12, 14, 16, the bottom side member 18, the support members 24, 26, 28, and the rim 22 may be cast as a singular integrated body. In another embodiment of the present invention, the furnace base 10, including the side wall members 12, 14, 16, the bottom side member 18, the support members 24, 26, 28, and the rim 22 may be machined as a singular integrated body.

Turning now to FIG. 6, a perspective view is shown of a furnace unit 30 installed in a furnace base 10 to provide enhanced air intake according to the present invention. As can be seen from FIG. 6, the furnace unit 30 may be installed in the furnace base 10 by simply lowering the furnace unit 30 into the furnace base 10 so that the frame of the furnace unit rests on the support members 24, 26, 28 of the furnace base 10.

Prior to disposing the furnace unit 30 in the furnace base 10, a metal plate commonly found underneath furnace units should be removed so that intake and return air passing through the air intake opening 20 of the furnace base 10 may travel from underneath the furnace unit 30 up through the bottom side of the furnace unit 30 as shown by the arrowed lines in FIG. 7.

The furnace unit 30 should be configured in the furnace base 10 so that the air intake opening 32 of the furnace unit aligns substantially adjacent and parallel to the air intake opening 20 of the furnace base 10, as shown in FIG. 6. The air intake opening 32 of the furnace unit may be formed by cutting an opening in the side of the furnace unit 30 where indicated by cut lines, which typically consist of depressed points or lines on the side of the metal frame of the furnace unit 30.

After configuring the furnace unit 30 in the furnace base 10 on the support members 24, 26, 28, the rim 22 should prevent or reduce air leaking through the junctures between the furnace unit 30 and the furnace base; however, any number of sealants, such as mastic or silicone, may be used on or in the junctures to ensure that the junctures are sealed and prevent air from leaking.

Typically, the furnace base 10 may be free standing without securing it to the floor. However, if desired, the furnace base 10 may be secured to the floor using any number of methods available to one skilled in the art. For example, the furnace base 10 may be secured to a cement floor using cement screws that may be driven through the furnace base 10 into the cement floor. The furnace base 10 may be secured to a wood floor using wood screws that may be drive through the furnace base into the wood floor.

Turning now to FIG. 7, an HVAC air return system is shown according to the present invention. The furnace unit 30 and furnace base 10 shown in FIG. 7 have been configured as shown in FIG. 6. As shown in FIG. 7, the HVAC air return system of the present invention may also be configured so that a first lateral side of the filter box 34 is disposed adjacent to or secured on the furnace unit 30 and the furnace base 10. The first lateral side of the filter box 34 should simultaneously cover the air intake opening 32 of the furnace unit and the air intake opening 20 of the furnace base 10 so that air passing through the air filter box 34 may simultaneously travel into the furnace unit through the air intake opening 32 on the lateral side of the furnace unit and into the air intake opening 20 of the furnace base 10 where the air may subsequently travel from underneath the furnace unit 30 up through the bottom side of the furnace unit 30 as shown by the arrowed lines in FIG. 7.

The first lateral side of the filter box 34 may be secured to the furnace unit 30 and the furnace base 10 by driving or screwing zip screws or bit tip screws through the metal frame of the filter box 34 and into the furnace unit 30 and the furnace base 10 respectively. After the filter box 34 has been secured to the furnace unit 30 and the furnace base 10, a sealant, such as mastic or silicone, may be applied to the seam of the juncture between the filter box 34 and the furnace unit 30 and the furnace base 10 to prevent air leakage.

As also shown in FIG. 7, a return air duct 36 may be disposed adjacent to or secured on a second lateral side of the filter box 34 so that intake and return air may be directed into the filter box 34. The return air duct 36 may be may be secured to the second lateral side of the filter box 34 by driving or screwing zip screws or bit tip screws through the metal frame of the open end of the return air duct 36 and into the metal frame of the filter box 34. After the return air duct 36 has been secured to the filter box 34, a sealant, such as mastic or silicone, may be applied to the seam of the juncture between the return air duct 36 and the filter box 34 to prevent air leakage.

As can be seen in FIG. 7, the filter box 34 is configured vertically on the side of the furnace unit 30 and the furnace base 10, which allows installation of a filter box having a width that is not limited by the height of the ceiling. Thus, the size of a filter box mounted in an HVAC air return system shown in FIG. 7 according to the present invention will not be limited by the height of the ceiling of the room where the HVAC system is installed. In one embodiment of the present invention, a five inch filter box 34 is used; however, it should be appreciated that a smaller or larger sized filter box 34 may be used according as desired or specified.

The present invention provides several benefits. The present invention allows a person to easily and inexpensively install a furnace unit on a base without making modifications to the furnace base before installing the furnace unit. The invention is also advantageous because the rim on the furnace base improves sealing at junctures between the furnace base and the furnace unit, reducing potential airflow leaks. Another advantage of the present invention is that it allows intake of filtered air into the furnace unit simultaneously through both the side and the bottom of the furnace unit, increasing airflow efficiency. The present invention also allows installation of a wider filter box on HVAC units installed in structures with standard or lower ceilings, thus allowing for improved air quality.

There is thus disclosed an improved HVAC base and return system for high-efficiency airflow. It will be appreciated that numerous changes may be made to the present invention without departing from the scope of the claims.

What is claimed is:

1. A furnace base for high efficiency airflow comprising:
   a first lateral wall member that is substantially rectangular in shape;
   a second lateral wall member that is substantially rectangular in shape;
   a third lateral wall member that is substantially rectangular in shape;
   a bottom side member that is substantially rectangular in shape;
   a plurality of A-frame shaped or tubular shaped furnace support members;
   wherein the first and second wall members are configured substantially at right angles to each other and the second and third lateral wall members are configured substantially at right angles to each other, the first, second and third lateral wall members forming three lateral walls of a rectangular box;
   wherein a first perimeter edge of the first lateral wall member, a first perimeter edge of the second lateral wall member, and a first perimeter edge of the third lateral wall member are respectively coupled to the bottom side member substantially along a first, second, and third perimeter edge of the bottom side member;

wherein a fourth side of the rectangular box is defined by an opening to permit air to pass through said fourth side of the rectangular box; and wherein the plurality of A-frame shaped or tubular shaped furnace support members are disposed in an interior portion of the rectangular box and are configured for supporting a furnace unit disposed directly on the plurality of A-frame shaped or tubular shaped furnace support members, the plurality of A-frame shaped or tubular shaped furnace support members extending from the bottom side member about each of the first, second, and third perimeter edges and terminating before a top edge of each of the first lateral wall member, the second lateral wall member, and the third lateral wall member thus leaving an upper rim portion, the upper rim portion being configured to extend over at least a portion of a furnace unit.

2. The furnace base of claim 1, wherein at least one or more of the first, second and third lateral wall members, the bottom side member, the plurality of A-frame shaped or tubular shaped furnace support members, and the upper rim portion are comprised of a temperature resistant material.

3. The furnace base of claim 2, wherein the temperature resistant material is a high-composite polymer.

4. The furnace base of claim 2, wherein the temperature resistant material is a heat resistant plastic.

5. The furnace base of claim 1, wherein at least one or more of the first, second and third lateral wall members, the bottom side member, the plurality of A-frame shaped or tubular shaped furnace support members, and the upper rim portion are comprised of a castable material.

6. The furnace base of claim 1, wherein at least one or more of the first, second and third lateral wall members, the bottom side member, the plurality of A-frame shaped or tubular shaped furnace support members, and the upper rim portion are comprised of a machinable material.

7. The furnace base of claim 1, wherein the first, second and third lateral wall members, the bottom side member, the plurality of A-frame shaped or tubular shaped furnace support members, and the upper rim portion comprise a singularly cast body.

8. The furnace base of claim 1, wherein the first, second and third lateral wall members, the bottom side member, the plurality of A-frame shaped or tubular shaped furnace support members, and the upper rim portion comprise a singularly machined body.

9. A high-efficiency HVAC return air system comprising:
a furnace base comprised of a singularly cast rectangular body wherein said singularly cast rectangular body includes a first lateral side defined by an opening to permit air to pass through said first lateral side of the furnace base, a plurality of A-frame shaped or tubular shaped interior braces for supporting a furnace unit, and second, third, and fourth lateral side members forming second, third, and fourth lateral walls which extend to form a rim above the plurality of A-frame shaped or tubular shaped interior braces;

a furnace unit including an opening through a first lateral side of said furnace unit to permit air to pass through the first lateral side of the furnace unit and an opening through a bottom side of said furnace unit to permit air to pass through the bottom side of the furnace unit;

wherein the furnace unit is disposed on the furnace base so that the rim of the furnace base covers at least a portion of the furnace unit, and wherein the furnace unit and furnace base are configured so that the first lateral side of the furnace base and the first lateral side of the furnace unit are substantially adjacent and parallel to each other;

a filter box having a first lateral side simultaneously disposed over the opening in the first lateral side of the furnace and over the opening forming the first lateral side of the furnace base; and a return air duct having an air return opening disposed to a second lateral side of the filter box;

wherein the return air duct, the filter box, the furnace unit, and the furnace base are configured to permit air to flow from the return air duct into the filter box and then pass simultaneously through the first lateral side of the furnace unit and the bottom side of the furnace unit.

10. The high-efficiency HVAC return air system of claim 9, wherein the width of the filter box between the return air duct and the furnace unit is about 5 inches.

11. The high-efficiency HVAC return air system of claim 9, wherein the vertical height of the furnace base is about four inches.

12. The high-efficiency HVAC return air system of claim 9, wherein at least one of the plurality of A-frame shaped or tubular shaped interior braces is A-frame shaped.

13. The high-efficiency HVAC return air system of claim 9, wherein at least one of the plurality of A-frame shaped or tubular shaped interior braces is tubular-shaped.

14. The furnace base of claim 1, wherein the plurality of A-frame shaped or tubular shaped furnace support members are configured to support a furnace unit disposed directly on the plurality of A-frame shaped or tubular shaped furnace support members such that the upper rim portion encompasses at least a portion of the furnace unit.

15. The furnace base of claim 14, wherein a seam of a juncture between the furnace unit and the upper rim portion is configured to be sealed by a sealant selected from the group consisting of silicone and mastic.

16. The furnace base of claim 14, further comprising:
wherein the opening forming the fourth side of the rectangular box is configured to receive a filter box, the filter box configured to be simultaneously disposed over the opening forming the fourth side of the rectangular box and an air return duct formed in the furnace unit; and wherein the return air duct, the filter box, the furnace unit, and the rectangular box are configured to permit air to flow from the return air duct into the filter box and then pass through the first lateral side of the furnace unit and the bottom side of the furnace unit.

* * * * *